(12) United States Patent
Bruno et al.

(10) Patent No.: US 9,249,274 B2
(45) Date of Patent: Feb. 2, 2016

(54) SHOCK ABSORPTION MATERIAL

(71) Applicant: New Aegis Corporation, Ann Arbor, MI (US)

(72) Inventors: Paul A. Bruno, Ann Arbor, MI (US); Ariana M. Bruno, Foothill Ranch, CA (US)

(73) Assignee: New Aegis Corporation, Ann Arbor, MI (US)

( * ) Notice: Subject to any disclaimer, the term of this patent is extended or adjusted under 35 U.S.C. 154(b) by 0 days.

(21) Appl. No.: 14/530,515

(22) Filed: Oct. 31, 2014

(65) Prior Publication Data

US 2015/0126631 A1    May 7, 2015

Related U.S. Application Data

(60) Provisional application No. 61/899,012, filed on Nov. 1, 2013.

(51) Int. Cl.
| | | |
|---|---|---|
| *C08J 9/42* | (2006.01) | |
| *A42B 3/12* | (2006.01) | |

(52) U.S. Cl.
CPC .. *C08J 9/42* (2013.01); *A42B 3/125* (2013.01); *C08J 2325/06* (2013.01); *C08J 2375/04* (2013.01); *C08J 2383/04* (2013.01); *C08J 2433/26* (2013.01); *C08J 2471/08* (2013.01); *C08J 2483/04* (2013.01)

(58) Field of Classification Search
CPC ...... C08J 9/42; C08J 2471/08; C08J 2483/04; C08J 2383/04; C08J 2325/06; C08J 2375/04; C08J 2433/26; A42B 3/125

See application file for complete search history.

(56) References Cited

U.S. PATENT DOCUMENTS

| | | | |
|---|---|---|---|
| 2001/0005699 A1* | 6/2001 | Morgan | A63B 7/0003 473/376 |
| 2004/0171321 A1 | 9/2004 | Plant | |
| 2005/0037189 A1* | 2/2005 | Palmer et al. | 428/304.4 |
| 2005/0160626 A1* | 7/2005 | Townsend | A43B 7/144 36/30 R |
| 2009/0286910 A1* | 11/2009 | Bloomfield | C08L 21/00 524/269 |
| 2010/0221521 A1 | 9/2010 | Wagner et al. | |
| 2012/0142239 A1 | 6/2012 | Budden et al. | |

OTHER PUBLICATIONS

PCT Application No. PCT/US2014/063526 International Search Report mailed Jan. 12, 2015.

* cited by examiner

*Primary Examiner* — Irina S Zemel
(74) *Attorney, Agent, or Firm* — Foley & Lardner LLP

(57) ABSTRACT

A composite material with an elastic modulus of less than 0.1 MPa at 100% elongation including a polymer matrix and a non-Newtonian fluid is provided. The composite material may be employed in shock and impact absorption applications to reduce initial and shockwave acceleration forces. Methods of forming the composite material and reducing acceleration forces in an impact utilizing the composite material are also provided.

19 Claims, 15 Drawing Sheets

SHOCK ABSORPTION MATERIAL

CROSS-REFERENCE TO RELATED PATENT APPLICATIONS

This application claims priority to and the benefit of U.S. Provisional Patent Application No. 61/899,012, filed Nov. 1, 2013, the entire disclosure of which is incorporated herein by reference.

BACKGROUND

The present application relates generally to the field of materials having utility in products and applications that provide shock absorption properties, such as those products and applications providing impact protection. More particularly, the present application relates to materials that comprise a polymer matrix impregnated with a non-Newtonian (i.e., shear thickening) material.

Shock absorption materials have utility in a wide variety of applications in which it is desirable to damp or mitigate undesirable shocks to objects or to the human body (e.g., helmets, sports padding, exercise mats, bicycle and motorcycle seats, bumpers for movable carts and other objects, and the like). Short term shocks (g-forces, measured in N·kg, in contrast to impact forces, which are measured in N·m) may be induced in impacts, drops, falls, earthquakes, and even explosions, and may also occur during non-impact situations (e.g., during vehicle acceleration and deceleration, airplane descent and ascent, person being pushed/pulled, etc.). By way of reference, impacts experienced by a football lineman may regularly result in g-forces of between approximately 20-30 g, and may in some instances produce forces in excess of 100 g. Jogging may produce g-forces of between approximately 4 and 6 g, while sprinting may produce g-forces of between approximately 8 and 10 g. The g-forces generated by impacts and other sources of shock pose a direct threat to the well-being and survival of humans every day, and significant resources are devoted each year to finding new and better ways of providing shock resistance or mitigation. Additionally, the g-forces generated by impacts may produce long-term negative health effects, such as chronic traumatic encephalopathy (CTE).

Certain types of relatively hard and rigid forms of polyurethane and polystyrene foams have been used in applications for shock absorption (e.g., in football helmets, etc.). These foams tend to be relatively dense. While such foams have the advantage of being able to withstand larger impacts, one disadvantage of such foams is that they have relatively limited compressibility, and may not optimally absorb the forces of smaller impacts experienced by the user and may not be as comfortable as would be desirable for certain applications. Research has shown that the cumulative effect of smaller, sub-concussive, impacts may be long-term negative health effects that exceed those of a limited number of large concussive impacts. Pre-existing materials are not capable of effectively absorbing both large impacts and small impacts, leaving a user susceptible to injury.

It would be advantageous to produce an improved material that may provide enhanced shock absorption and that reduces or eliminates g-forces caused by impacts and other sources of shock. It would also be advantageous to incorporate such a material into products so as to provide enhanced shock protection. These and other advantages will be apparent to those reviewing the present disclosure.

SUMMARY

An exemplary embodiment relates to a composite material that comprises a polymer matrix (e.g., a foam material, although according to other exemplary embodiments, other types of polymer matrix materials may be utilized) and a non-Newtonian fluid (sometimes referred to as a shear thickening material or dilatant) incorporated therein. The non-Newtonian fluid may be infused into a pre-prepared polymeric matrix material or may be incorporated during the synthesis or polymerization of the polymer matrix.

The composite material has an elastic modulus of less than 0.1 MPa at 100% elongation, and includes a polymer matrix in the form of a foam and a non-Newtonian fluid impregnated in the polymer foam matrix. The polymer foam may be an open-cell foam or a closed-cell foam. The polymer foam may have a density in the range of about 50 $g/m^3$ to about 500,000 $g/m^3$. The polymer foam may be formed from a material selected from the group including elastomers, polystyrene, polyethylene, polypropylene, polyamide, polyurethane, ethylvinyl-acetate, polyethylene oxide, polyacrylate, cellulose, ethylene vinyl alcohol, polybutylene, polycaprolactone, polycarbonate, polyketone, polyester, polylactic acid, polyvinyl chloride, polyphenylene, and copolymers thereof. The non-Newtonian fluid may not be covalently bonded to the polymer foam. The non-Newtonian fluid may include at least one material selected from the group including polydimethylsiloxane, substituted polydimethylsiloxane, 1% w/v polyethylene glycol in water, 1% w/v polyacrylamide in water, C8-silica particles in silicone oil, silica particles in glycerol, and tin oxide particles in water. The non-Newtonian fluid may have a viscosity in the range of about 60,000 cSt to about 1,000,000 cSt. The non-Newtonian fluid may be hydrophobic. The composite material may have a density in the range of about 50 $g/m^3$ to about 5,000,000 $g/m^3$. The non-Newtonian fluid may be present in an amount of about 10% to about 90% of the total weight of the composite material. The composite material may be incorporated into a product selected from the group including a helmet, clothing, a uniform, footwear, a glove, a case for an electronic device, a housing for an electronic device, a vehicle seat, a vehicle headrest, a vehicle dashboard, a vehicle door component, playground equipment, an exercise mat, a gym mat, and a packaging material. An initial impact acceleration force and a shockwave acceleration force of an impact cushioned by the composite material may be less than an initial impact acceleration force and a shockwave acceleration force of an equivalent impact cushioned by the polymer foam alone. An impact cushioned by the composite material may produce initial impact acceleration forces that are at least about 30% lower than an equivalent impact cushioned by the polymer foam alone.

Another exemplary embodiment relates to a product, apparatus, or device (collectively referred to as "products") that incorporates a composite material such as that described in the preceding paragraph. Non-exclusive examples of products that may utilize such composite materials include helmets (e.g., sports helmets for use in football, baseball, hockey, lacrosse, or other sports in which impacts may be experienced, motorcycle and bicycle helmets, and any other type of helmet); padding for clothing or uniforms (e.g., shoulder pads, shin pads, knee pads, elbow pads, and any other type of padding worn by a human); footwear (shoe soles, etc.); gloves (e.g., work gloves, sporting gloves such as boxing gloves, hockey gloves, lacrosse gloves, etc.); cases or housings for electronics such as phones, computers, tablets, and the like; linings or padding for vehicle seats, child safety seats, and other types of seating; vehicle headrests, dashboards, door components, and other vehicle parts that may be impacted by a driver or passenger in a vehicle collision; playground equipment lining; exercise and gym mats; and packaging material for goods. Stated differently, the composite material may be incorporated into a helmet, clothing, a uniform, footwear, a glove, a case for an electronic device, a housing for an electronic device, a vehicle seat, a vehicle headrest, a vehicle dashboard, a vehicle door component, playground equipment, an exercise mat, a gym mat, or a packaging material.

Another exemplary embodiment relates to a method of making the composite material and/or products made from or incorporating the composite material. For example, an exemplary method may include the steps of producing a non-Newtonian fluid, producing or forming a polymer matrix, and incorporating the non-Newtonian fluid into the polymer matrix. In another example, a method may utilize a non-Newtonian fluid in the synthesis or polymerization of the polymer matrix such that the non-Newtonian fluid is incorporated into the matrix immediately upon formation of the matrix. Still another example includes the steps of producing a composite material that comprises a polymer matrix incorporating a non-Newtonian fluid and incorporating the composite material into a finished product such as those described herein.

An exemplary method of forming the composite material includes mixing a non-Newtonian fluid and a first polymer foam matrix precursor to form a mixture, adding a second polymer foam matrix precursor to the mixture of the non-Newtonian fluid and the first polymer foam matrix precursor, mixing the mixture of the non-Newtonian fluid, first polymer foam matrix precursor, and second polymer foam matrix precursor to form a mixture; wherein mixing the mixture of the non-Newtonian fluid, first polymer foam matrix precursor, and second polymer foam matrix precursor results in the foaming of the mixture and the formation of a polymer foam matrix material, and curing the mixture of the non-Newtonian fluid, first polymer foam matrix precursor, and second polymer foam matrix precursor to form the composite material. The formed composite material has an elastic modulus of less than 0.1 MPa at 100% elongation. The method may further include disposing the mixture of the non-Newtonian fluid, first polymer foam matrix precursor, and second foam polymer matrix precursor in a mold prior to curing the mixture.

A method of reducing acceleration forces in an impact may include disposing a composite material between an impact object and an impact surface. The composite material has an elastic modulus of less than 0.1 MPa at 100% elongation and includes a polymer foam matrix and a non-Newtonian fluid impregnated in the polymer foam matrix. An initial impact acceleration force and a shockwave acceleration force of the impact may be less than an initial impact acceleration and a shockwave acceleration of an equivalent impact with the polymer foam alone disposed between the impact object and the impact surface. The impact may produce an initial impact acceleration force that is at least about 30% lower than an equivalent impact with the polymer foam alone disposed between the impact object and the impact surface.

DETAILED DESCRIPTION

Figure 1:
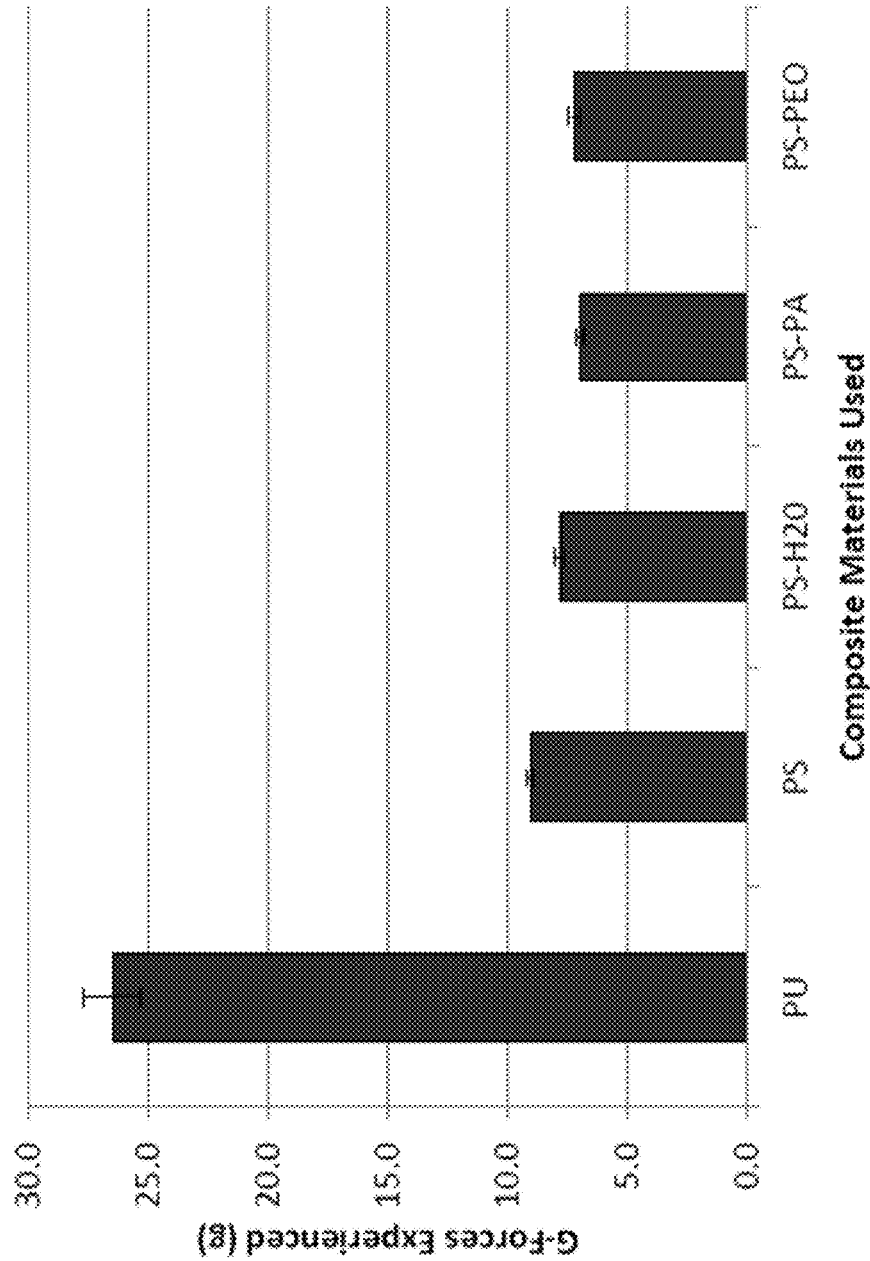
FIGS. 1-3 are graphs illustrating comparative test results for drop tests performed at 5, 7.5, and 11 inches, respectively.

According to an exemplary embodiment, a shock absorption material includes a polymer matrix (e.g., a polymer foam such as a polystyrene or polyurethane foam, although other materials may be used according to other exemplary embodiments as described herein, including copolymers of various types) impregnated with a non-Newtonian fluid to provide enhanced shock absorption characteristics for the material and products incorporating such a material. A wide variety of non-Newtonian fluids may be utilized, either alone or in combination with each other, depending on the particular performance characteristics, manufacturing considerations, and other factors.

A non-Newtonian fluid is a fluid that is characterized by the fact that its shear viscosity increases with applied shear stress. A non-Newtonian fluid may sometimes be referred to as a shear thickening material or dilatant, and for purposes of the present disclosure, the three terms will be used interchangeably. For example, a non-Newtonian fluid may exhibit the properties of a liquid when the material is at rest, but when a force or stress is applied to the material, the material begins to essentially "thicken" and adopt some properties of a solid material. One well-known example of a non-Newtonian fluid is a mixture of cornstarch and water sometimes referred to as "oobleck," which exhibits certain shear-thickening characteristics when a stress is applied to the material.

According to an exemplary embodiment, the composite material may be formed of a relatively soft foam matrix (e.g., a polystyrene foam, a polyurethane foam, etc.) having a non-Newtonian fluid incorporated therein. A soft foam matrix may refer to a matrix material that is highly compressible. One advantageous feature of such a composite material is that the material may act as a soft foam under normal conditions in which little or no forces/stresses are applied to the material, and when larger forces/stresses are applied, the material increase in stiffness and/or hardness to better absorb the shock or impact. Because the softening/hardening effect is reversible, the composite material will return to its original soft-foam-like behavior, such that the material can be used for relatively long periods of time while retaining its shock-absorbing effectiveness in response to applied forces/stresses. The composite material is capable of providing impact protection over a larger range of forces than is typical of pre-existing foam materials.

The polymeric matrix may be formed from any of a wide variety of materials, including, for example, natural and synthetic elastomers (e.g., cis-polyisoprenes, trans-polyisoprenes, polybutadiene, neoprene, butyl rubber (both halogenated and unhalogenated), nitrile, silicone rubber, fluorosilicone rubber, and polyacrylonitrile), polystyrene, polyethylene (high density and low density), polypropylene, polyamide, polyurethane, ethylvinyl-acetate, polyethylene oxide, polyacrylate, cellulose, ethylene vinyl alcohol, polybutylene, polycaprolactone, polycarbonate, polyketone, polyester, polylactic acid, polyvinyl chloride, and polyphenylene. According to other exemplary embodiments, the polymer matrix may include any combination of the polymers as a copolymer (including alternating, periodic, random, block and graft copolymers). According to other exemplary embodiments, the polymer matrix may include fluorinated versions of any of the foregoing polymers or any of the foregoing polymers that have been substituted with other branched alkyl, aryl, or halogenated substitutions.

According to a particular exemplary embodiment, the polymer matrix is formed of a relatively soft polystyrene foam. In general, polystyrene tends to be less dense than polyurethane, which makes it more suitable for absorbing the impact forces of small objects as compared to polyurethane, while the increased density of polyurethane allows it to be more capable of absorbing forces of large impacts as compared to polystyrene (additionally, polyurethane may be better in certain applications where water and sweat are present, since it is less susceptible to water vapor absorption and mold growth than polystyrene). Both polystyrene and polyurethane (and other polymers, such as those described above) may be formed into relatively soft foams, and the inventors have advantageously incorporated a non-Newtonian fluid into relatively soft foams to provide enhanced shock absorption properties for the foam. As will be described in more detail below, the incorporation of a non-Newtonian fluid into the polystyrene foam may dramatically alter the overall shock absorption capabilities of the material, making it far more suitable for use in shock absorption applications.

According to an exemplary embodiment, the polystyrene foam has a density of between approximately 50 $g/m^3$ and approximately 500,000 $g/m^3$, such as between approximately 50,000 $g/m^3$ and approximately 500,000 $g/m^3$ and, according to a particular exemplary embodiment, approximately 100,000 $g/m^3$. Of course, other types of foam and other densities may be utilized according to other exemplary embodiments.

According to other exemplary embodiments, the polymer matrix may be formed from any of the other materials described herein, and may have differing materials properties that may be tailored or selected for a particular application as desired.

The non-Newtonian fluid may be selected from any of a variety of materials that exhibit shear thickening behavior, non-exclusive examples of which include polydimethylsiloxanes, 1% w/v polyethylene glycol in water, 1% w/v polyacrylamide in water, or polydimethylsiloxanes with other alkyl, alkenyl, alkynyl, phenyl, or halogenated substitutions in place of the methyl group. Other possibilities include C8-silica particles in a silicone oil, silica particles in glycerol, and tin oxide particles in water. According to one embodiment, the non-Newtonian fluid is not covalently bonded to the polymer foam matrix. Covalent bonds between the polymer foam matrix and the non-Newtonian fluid may constrain the movement of the non-Newtonian fluid in response to an impact, preventing the effective absorption of impact energy and the effective reduction of impact energy acceleration forces. Covalent bonds between the polymer foam matrix and the non-Newtonian fluid may also undesirably change the properties of the polymer foam, such as by increasing the density of the polymer foam.

According to an exemplary embodiment, the non-Newtonian fluid may have a viscosity in the range of between approximately 60,000 cSt and approximately 1,000,000 cSt. According to other exemplary embodiments, the non-Newtonian fluid may have a viscosity of between approximately 100,000 cSt and approximately 500,000 cSt.

According to an exemplary embodiment, the composite material (i.e., the foam having the non-Newtonian fluid incorporated therein) may have a density in the range of between approximately 50 $g/m^3$ and approximately 5,000,000 $g/m^3$, such as between approximately 50 $g/m^3$ and approximately 3,000 $g/m^3$ or between approximately 15,000 $g/m^3$ and approximately 400,000 $g/m^3$. According to other exemplary embodiments, the composite may have a density of between approximately 5,000 $g/m^3$ and approximately 5,000,000 $g/m^3$, while in still other exemplary embodiments, the density may be between approximately 50,000 $g/m^3$ and approximately 500,000 $g/m^3$. According to a particular exemplary embodiment, the composite may have a density of approximately 100,000 $g/m^3$. The density of the composite material may be directly correlated to the elastic modulus of the composite material, such that lower density composite materials may have lower elastic moduli. Low density composite materials may also reduce the weight of products including the composite materials.

Figure 4:
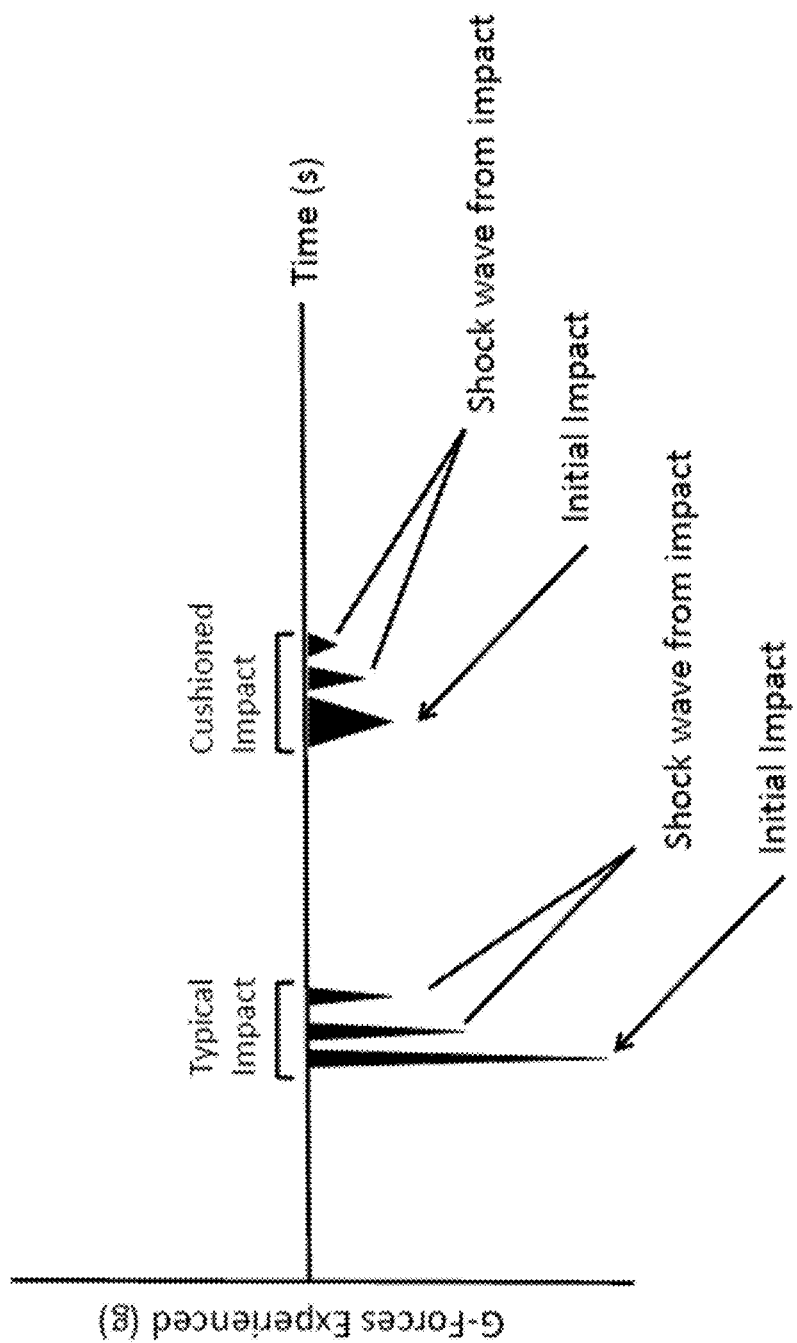
FIG. 4 is a graph illustrating expected shock absorption profiles for normal impacts as compared to cushioned impacts.

The composite material may have an elastic modulus at 100% elongation of less than approximately 0.1 MPa. According to a particular exemplary embodiment, the composite material may have an elastic modulus at 100% elongation of between approximately 0.001 MPa and approximately 0.1 MPa, such as between approximately 0.01 MPa and approximately 0.05 MPa. The elastic modulus indicates the elastic behavior of the composite material. A low elastic modulus indicates a highly compressible material, and highly compressible materials are well suited to reducing impact acceleration forces in small impact events. Additionally, composite materials with elastic moduli below approximately 0.1 MPa are capable of reducing the shockwave acceleration forces in an impact event. Shockwave acceleration forces are the acceleration forces produced as a result of an impact after the initial impact acceleration forces, as shown in FIG. 4.

According to an exemplary embodiment, the non-Newtonian fluid may be provided at a level of between approximately 10 percent and approximately 90 percent of the total weight of the composite material. According to a particular exemplary embodiment, the non-Newtonian fluid may be approximately 30 percent of the weight of the composite material. According to other exemplary embodiments, the weight percentage of the non-Newtonian fluid in the composite material may be varied depending on the particular performance criteria desired and other factors.

Any of a variety of methods may be used to incorporate the non-Newtonian fluid into the polymeric matrix. For example, according to an exemplary embodiment, the composite could be made by incorporating the non-Newtonian fluid before the polymerization/foaming process of elastomer by adding the non-Newtonian fluid to one of the precursor materials used to form the polymer matrix. According to another exemplary embodiment, the composite can be made by adding the non-Newtonian fluid to a polymerized/foamed elastomer using injection or absorption methods. According to one embodiment, the non-Newtonian fluid is uniformly or homogenously dispersed in the polymer foam matrix.

Experimental testing was performed to determine the efficacy of incorporating non-Newtonian fluids into polymer matrices for enhancing the shock absorption properties thereof. Two non-Newtonian fluids were used in the testing: (1) a polyacrylamide/water non-Newtonian fluid characterized as having a generally linear polymer chain, a molecular weight of greater than 1,000,000, and minimal hydrogen bonding, and (2) a polyethylene glycol/water non-Newtonian fluid characterized as having a generally linear polymer chain, a molecular weight of greater than 4,000,000, and a large degree of hydrogen bonding.

Five series of samples were produced to assess shock absorption performance: (1) polyurethane foam with no incorporated non-Newtonian fluid (PU), (2) polystyrene foam with no incorporated non-Newtonian fluid (PS), (3) polystyrene foam with water incorporated therein (PS-$H_2O$); (4) polystyrene foam with a polyacrylamide/water non-Newtonian fluid incorporated therein (PS-PA), and (5) polystyrene foam with a polyethylene glycol/water non-Newtonian fluid incorporated therein (PS-PEO). Additional information regarding the five samples is provided below in Table 1.

TABLE 1

| Composite Material | Foam Material | Fluid | Foam volume (cm$^3$) | Foam Weight (g) | Foam Density (g/cm$^3$) |
|---|---|---|---|---|---|
| PU | Polyurethane | none | 135 | 4 | 0.02962963 |
| PS | Polystyrene | none | 135 | 4 | 0.02962963 |
| PS-$H_2O$ | Polystyrene | $H_2O$ | 135 | 34 | 0.251851852 |
| PS-PA | Polystyrene | polyacrylamide/$H_2O$ | 135 | 34 | 0.251851852 |
| PS-PEO | Polystyrene | polyethylene glycol/$H_2O$ | 135 | 34 | 0.251851852 |

Figure 2:
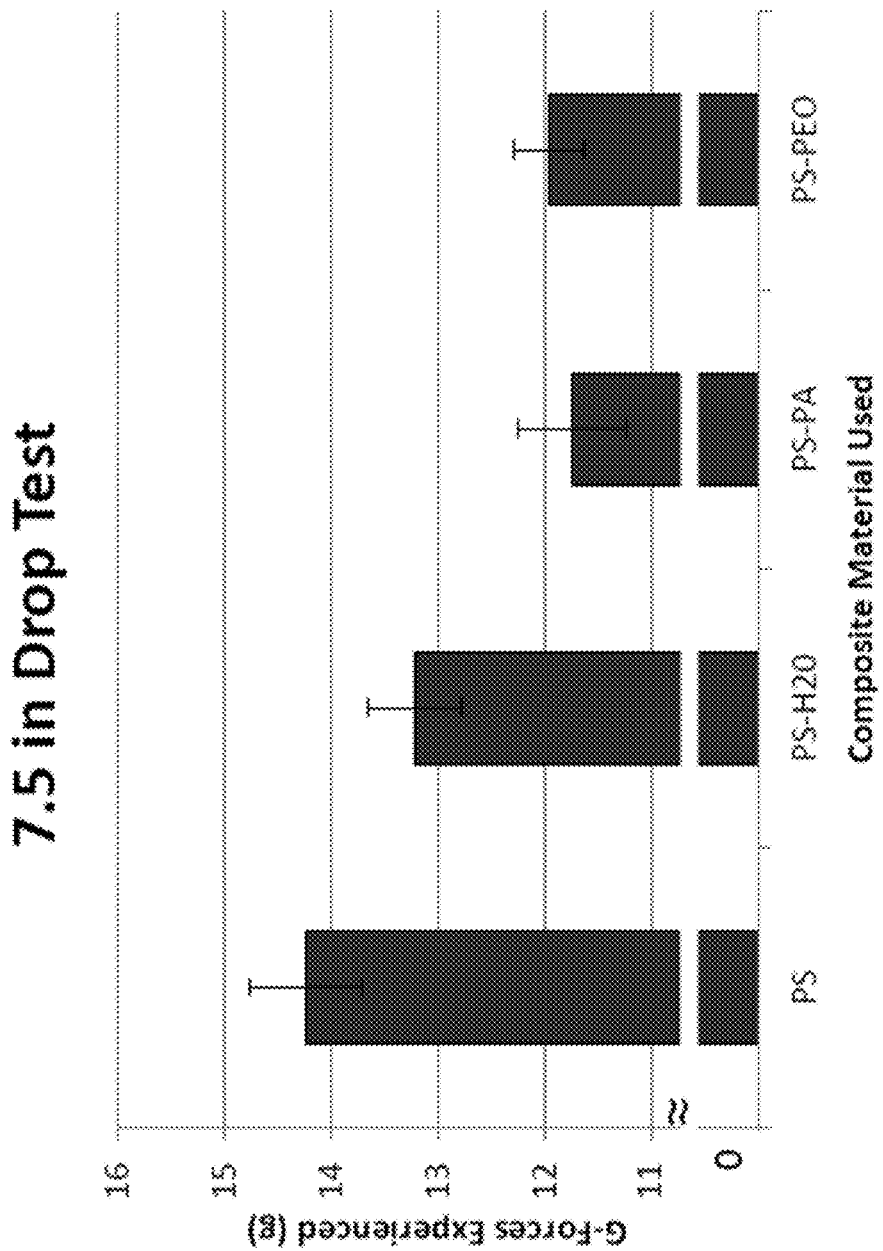
Figure 3:
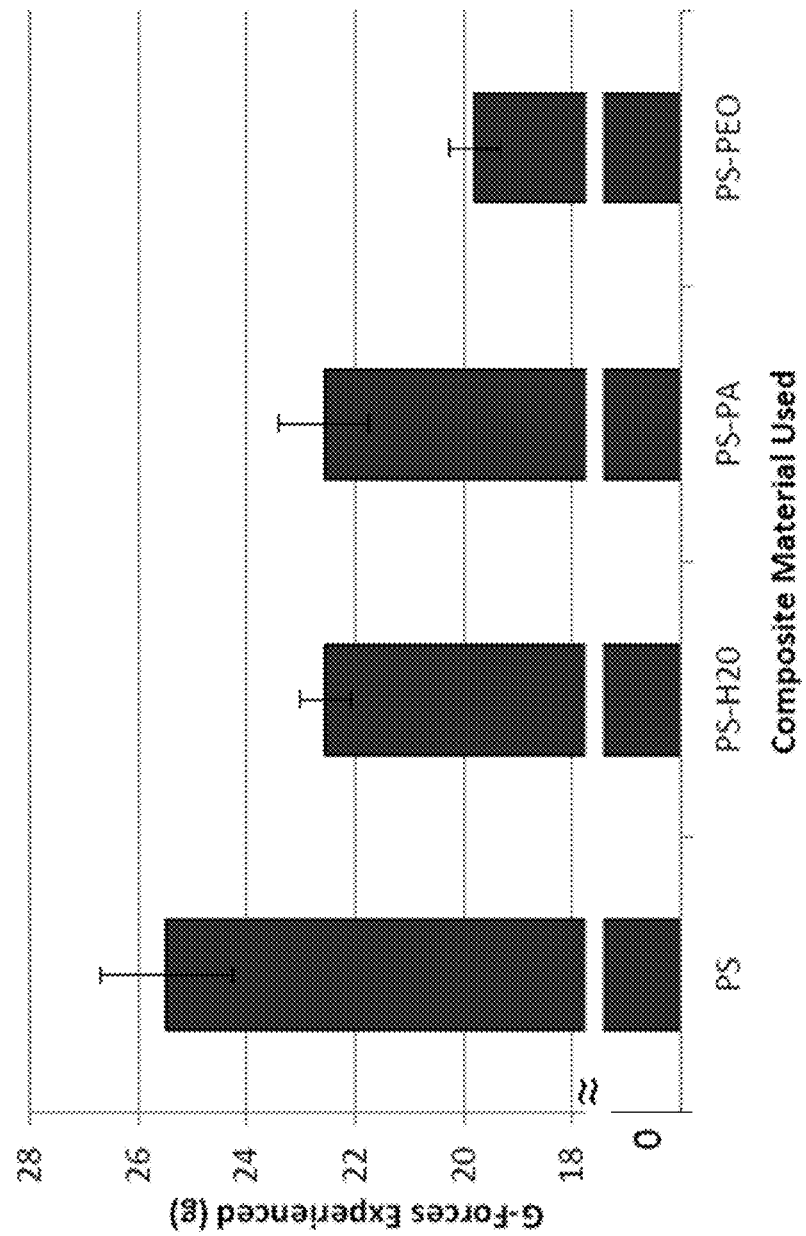

To test the shock absorption performance of the materials, each of the samples was placed on a flat surface and an impact object weighing 1.5 pounds that was fitted with an accelerometer was dropped onto each of the samples from three different heights. FIGS. 1-3 graphically illustrate the g-forces experienced by the samples when objects were dropped from heights of 5 inches, 7.5 inches, and 11 inches, respectively. Multiple drops were performed for each sample, and the numbers illustrated graphically represent the average results from the multiple tests. As illustrated in FIG. 1, all of the polystyrene-based materials appear to better absorb g-forces at a relatively low drop height as compared to polyurethane foam, this may be a function of higher compressibility of the polystyrene-based materials. Each composite material exhibited a reduction in g-forces of greater than about 60% in comparison to the polyurethane foam. Additionally, it appears that each composite material (i.e., polystyrene impregnated with water or a non-Newtonian fluid) outperforms polystyrene foam by itself. From this data, it appears that the addition of both water and a non-Newtonian fluid may improve the shock absorption performance of the polystyrene foam.

FIG. 2 graphically illustrates the shock absorption performance of the polystyrene foam and polystyrene foam composites when dropped from a height of 7.5 inches. In this case, it appears that the water-impregnated polystyrene is marginally better at absorbing g-forces than polystyrene by itself (nearly an 8% reduction), while the addition of non-Newtonian fluids into the polystyrene foam both decrease the amount of g-forces experienced by more than 15%, suggesting a significant improvement through the addition of non-Newtonian fluids into the polymer matrix.

FIG. 3 graphically illustrates the shock absorption performance of the polystyrene foam and polystyrene foam composites when dropped from a height of 11 inches. At this height, a difference between the two different non-Newtonian fluids became apparent, with the polyacrylamide-impregnated polystyrene foam showing similar performance as the water-impregnated polystyrene foam (suggesting that the polyacrylamide-impregnated foam has exceeded its damping capability at this height), while the polyethylene glycol impregnated polystyrene foam significantly outperformed the other foams. One possible explanation for the differing performance of the two different non-Newtonian fluids may be the difference in the extent of the hydrogen bonding between the two materials, with the polyethylene glycol having significantly more hydrogen bonding as compared to the polyacrylamide.

Figure 5:
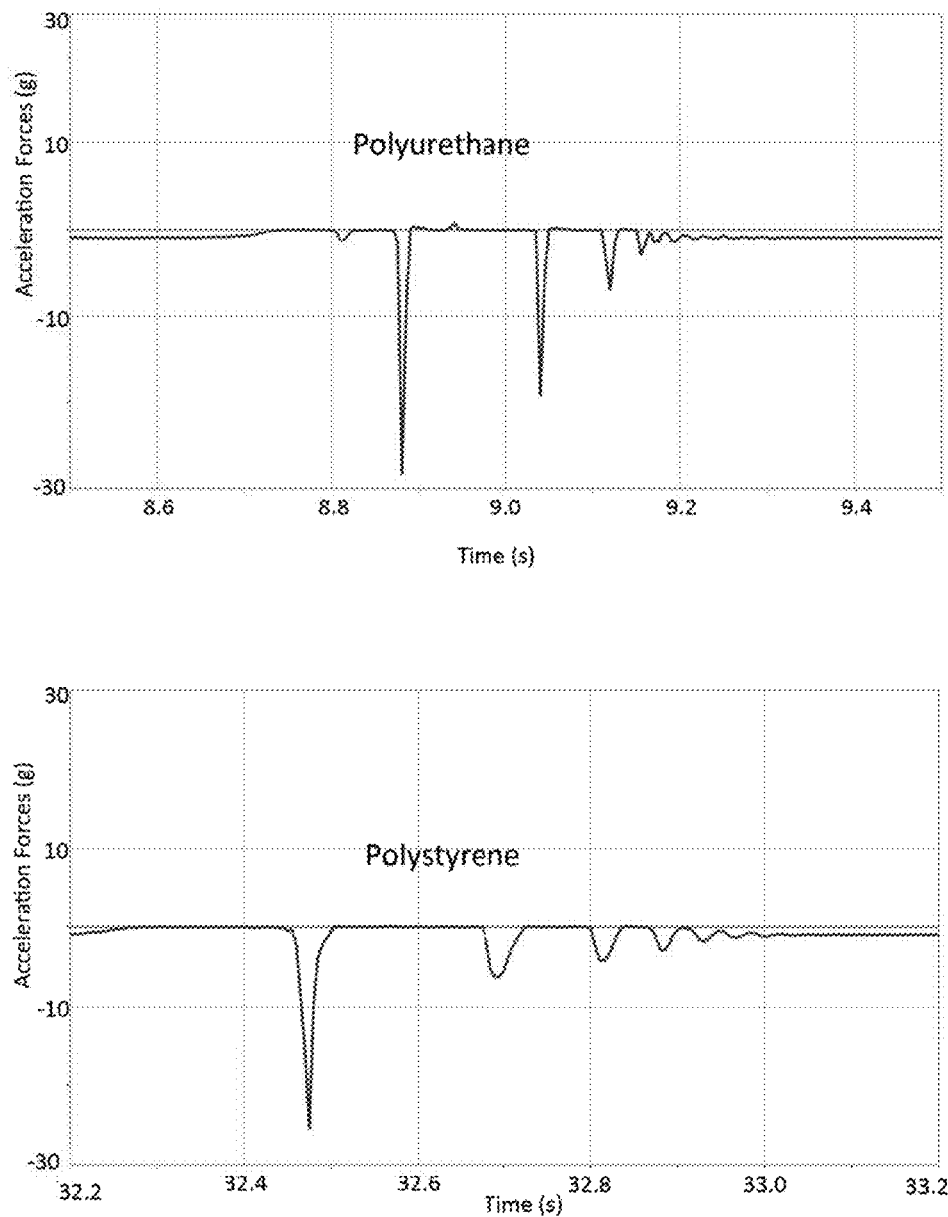
FIG. 5 is a pair of graphs comparing shock absorption profiles of polyurethane and polystyrene foams.
Figure 6:
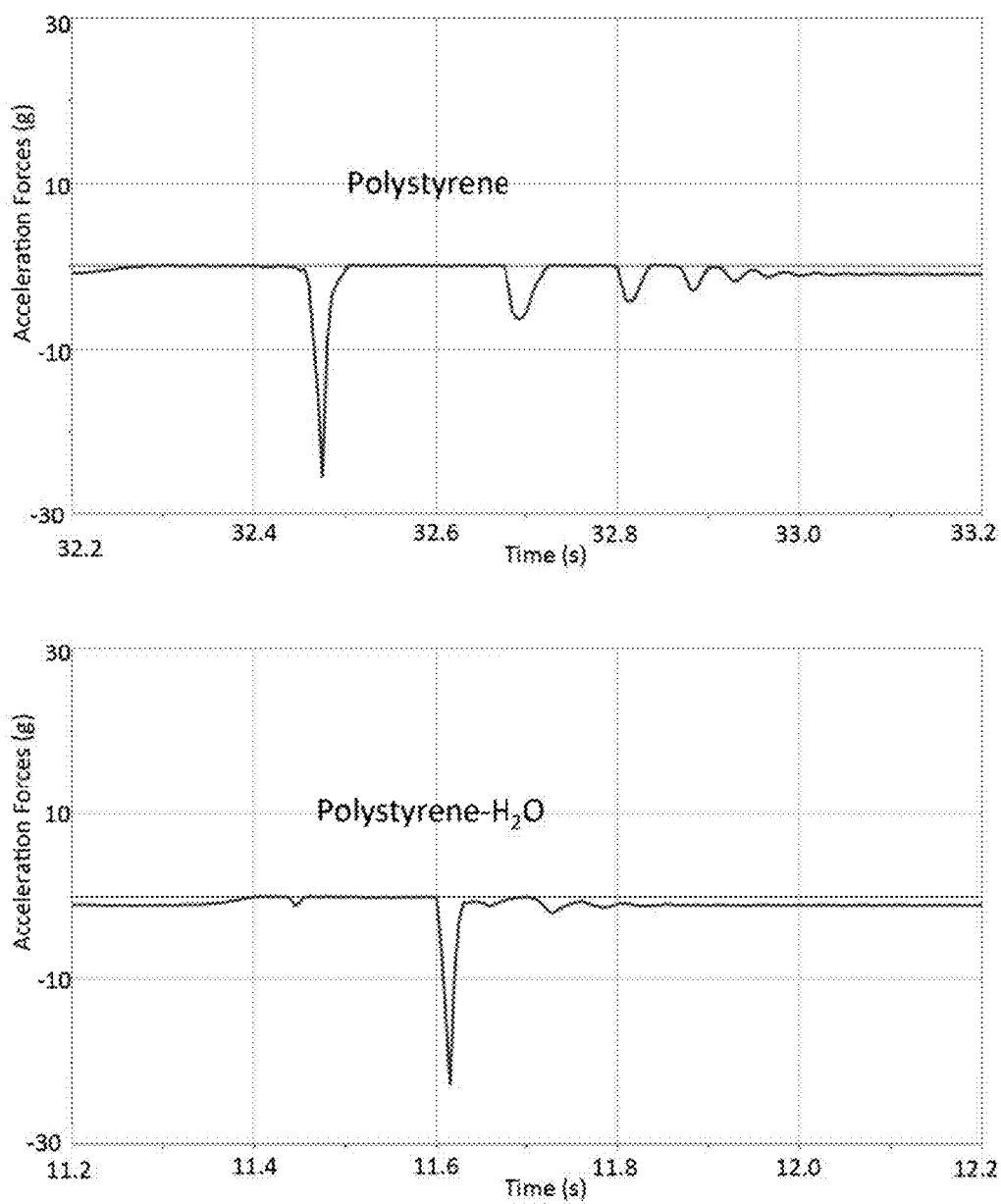
FIG. 6 is a pair of graphs comparing shock absorption profiles of polystyrene and polystyrene impregnated with water.
Figure 7:
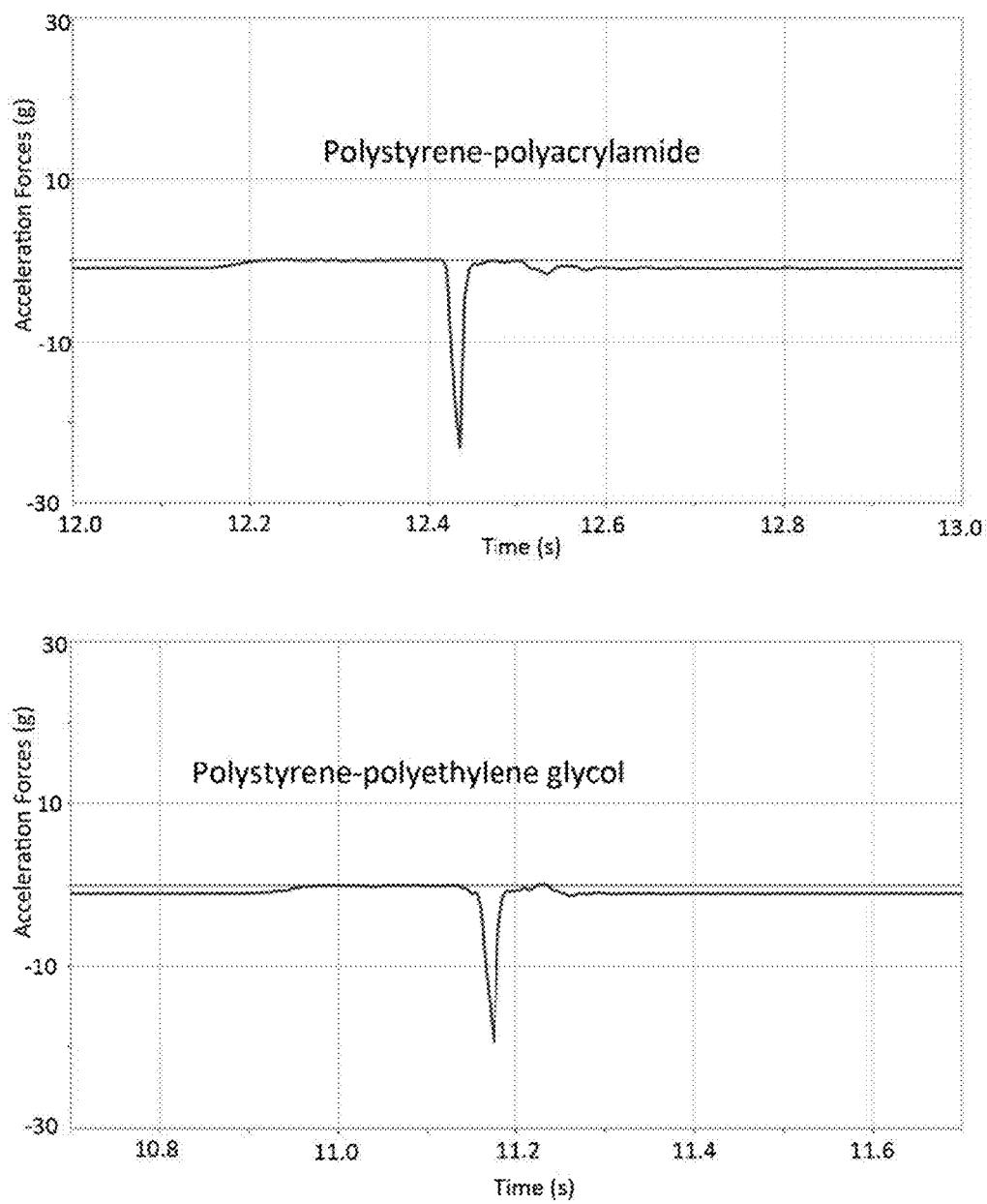
FIG. 7 is a pair of graphs comparing shock absorption profiles of polystyrene impregnated with two different non-Newtonian fluids.
Figure 8B:
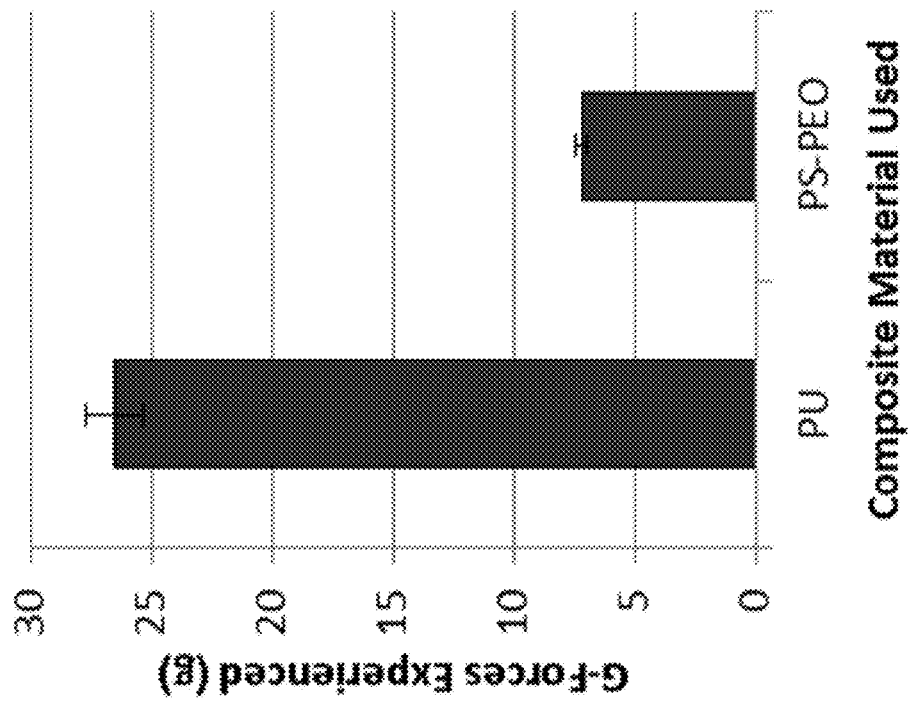
FIGS. 8(a)-8(d) illustrate a series of graphs summarizing the shock absorption behavior of polystyrene impregnated with select non-Newtonian fluids.
Figure 8A:
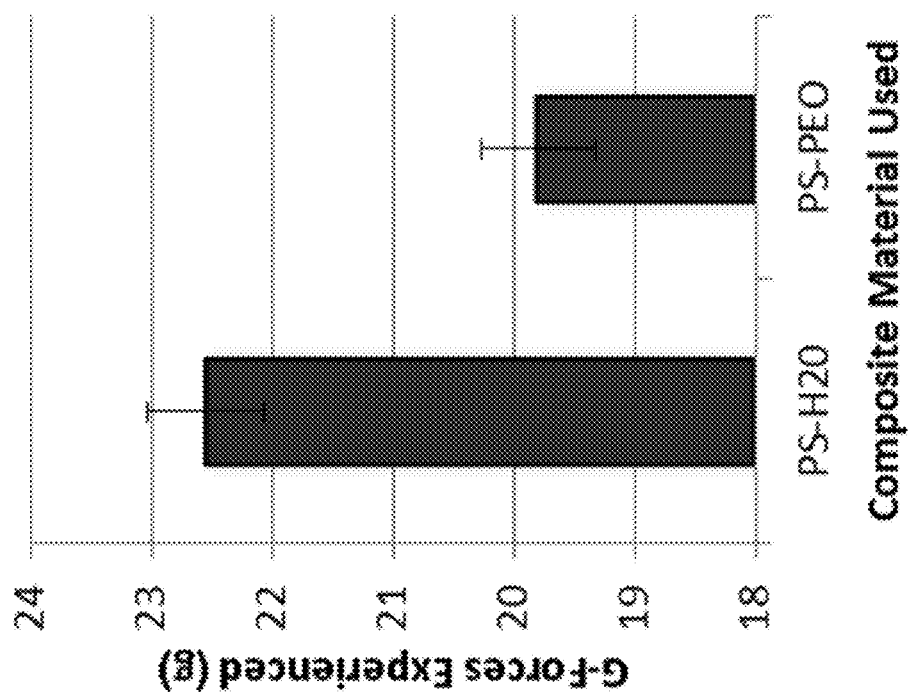
Figure 8C:
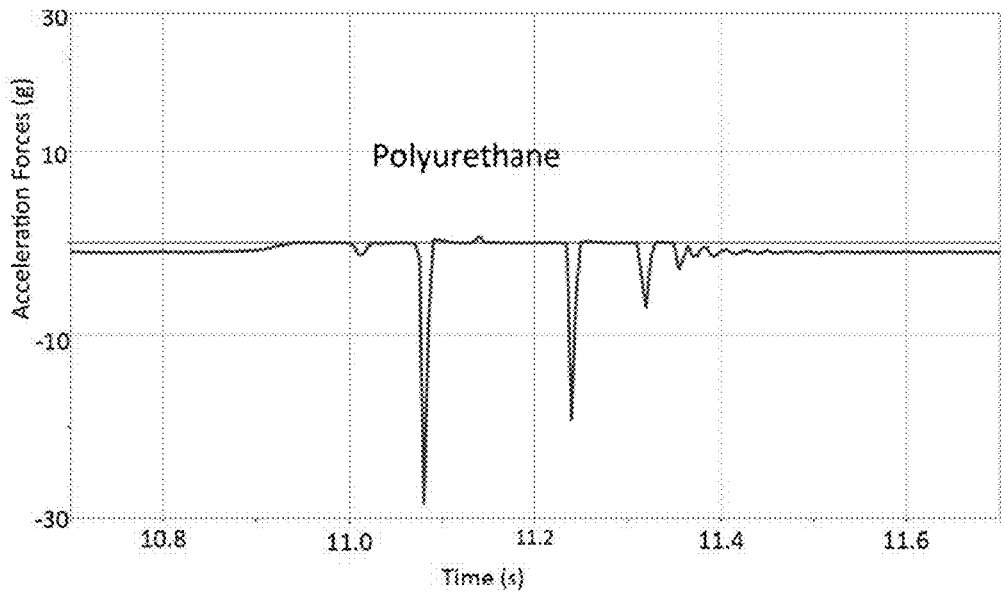
Figure 8D:
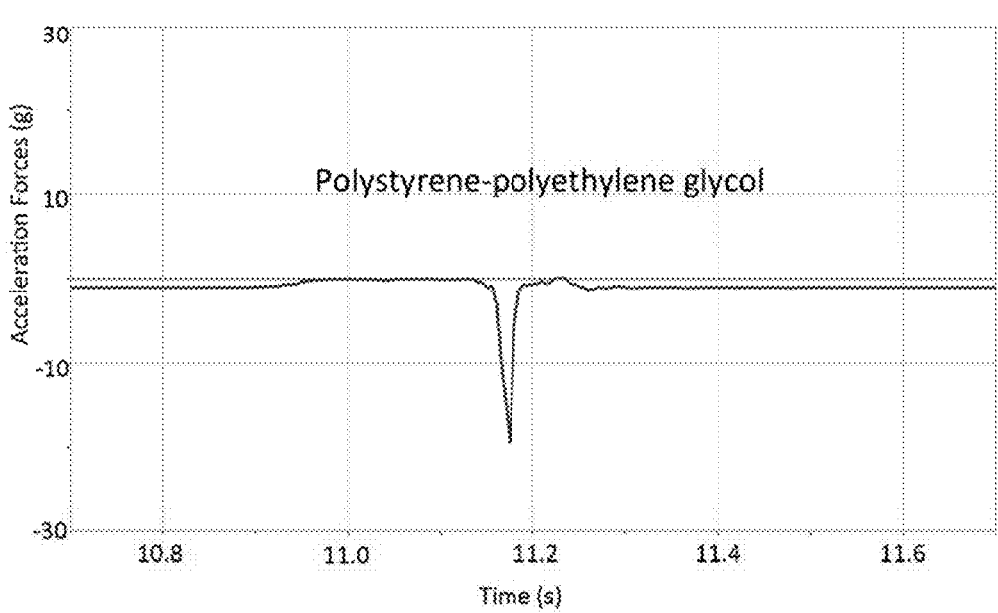

Next, the shock absorption profiles of the different materials were measured to understand the differences between them. FIG. 4 illustrates shock absorption profiles for typical and cushioned impacts, while FIGS. 5-7 illustrate the shock absorption profiles for the various materials discussed above. FIG. 5 illustrates that polystyrene foam absorbs impact over a longer period of time in comparison to polyurethane, as demonstrated by the broader peaks observed for the polystyrene material. This data indicates that the polystyrene material appears to be more compressible than the polyurethane material. Each of the impregnated polystyrene foams have a different shock profile than the non-impregnated polyurethane and polystyrene foams, with the secondary shockwave after initial impact being significantly diminished in the impregnated foams as compared to the non-impregnated foams. FIG. 8 summarizes the initial results. The polyethylene glycol impregnated polystyrene foam demonstrates a moderate decrease in g-forces experienced compared to water-impregnated polystyrene and non-impregnated polystyrene (~13% reduction) and greatly attenuates the g-forces experienced compared to polyurethane foam (>70% reduction), as shown in FIGS. 8($a$) and 8($b$), respectively. The material also adopts a shock absorption profile as shown in FIG. 8($d$) that is consistent with absorption of g-force over increased time as well as a greatly diminished shockwave after initial impact in comparison to the shock absorption profile of the polyurethane foam as shown in FIG. 8($c$).

Notably, after each drop, it was apparent that the foams impregnated with non-Newtonian fluid returned to their pre-drop states having a relatively soft foam-like-behavior. This suggests that the enhanced dampening and shock absorption of the impregnated foams was the result of a temporary shear thickening of the non-Newtonian fluid, which reversibly transitioned back to its pre-stress state in repeatable fashion. As a result, it would be expected that in normal use (i.e., before shock is applied to the material) the foams would have a relatively soft and cushioned feel, and that the application of shock will case a temporary and reversible hardening of the material to absorb the shock, after which the foam will return to its original state. Advantageously, this may provide a soft and cushioned feel for a user in certain applications (e.g., helmets, gloves, etc.) to provide improved user comfort during normal use. The composite material is therefore capable of absorbing both small impacts when acting as a soft foam and large impacts upon hardening, providing protection against a larger range of impacts than pre-existing foam materials which are directed to absorbing either small impacts or large impacts.

Because non-Newtonian fluids such as polyacrylamide and polyethylene glycol are water soluble, it is possible that their effectiveness at absorbing shock in applications where water exposure is present may be limited. Under certain circumstances, evaporation and environmental effects may also play a role in diminishing the effectiveness of the non-Newtonian fluid impregnated polymer matrices. Accordingly it may be advantageous for certain applications to encase the composites in a polymer coating or "skin" to control environmental impact on the effectiveness of the material.

According to another exemplary embodiment, the effect of the surrounding environment may be mitigated by utilizing a hydrophobic material in place of a water-based non-Newtonian fluid and/or incorporating the non-Newtonian fluid prior to polymerization of the polymer matrix in an effort to "trap" the non-Newtonian fluid within the foam and combat evaporation and other environment-related concerns.

Figure 9:
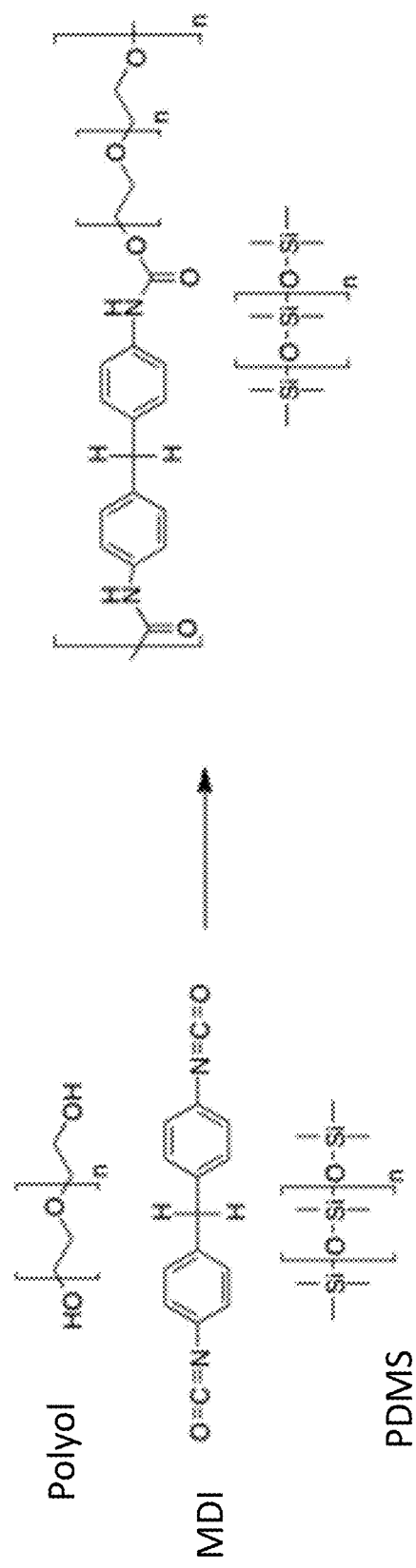
FIG. 9 provides a description of a polymerization process incorporating a non-Newtonian fluid according to an exemplary embodiment.

FIG. 9 provides an overview of a process for preparing a composite material that involves adding a non-Newtonian fluid (in this case, high molecular weight polydimethylsiloxane, otherwise referred to as PDMS) to the components used in synthesizing a polymer (polyurethane) foam (in this case, a low molecular weight polyol (polyether chain) and methylene-diphenyl-diisocyanate (MDI)). After the components are mixed, the polyol and MDI begin to polymerize, incorporating the PDMS during the polymerization process. Excess MDI releases $CO_2$, foaming the material. The PDMS is inert during the polymerization process, such that the PDMS is not covalently bonded to the polymer foam matrix. The resulting polyurethane foam has a far lower density than the polyurethane foam discussed in the context of FIGS. 1-8, and more closely resembles the feel and density of the polystyrene foams discussed previously.

According to other exemplary embodiments, different non-Newtonian fluids and foam precursors may be used, depending on the desired performance characteristics of the composite material, manufacturing considerations, and/or other factors. It bears noting that the PDMS was found to be soluble in the polyol, which was found to aid in the complete dispersion or homogenization of the non-Newtonian fluid throughout the resulting composite material. The polyol, MDI, and PDMS were then polymerized together while the non-Newtonian fluid was in solution, which allowed for the production of a composite material with a fully incorporated and "trapped" non-Newtonian fluid within the polymer foam matrix. One particularly advantageous feature of using relatively long-chain PDMS is that it does not evaporate during normal use, thereby providing enhanced non-Newtonian fluid properties and being water resistant.

Figure 10:
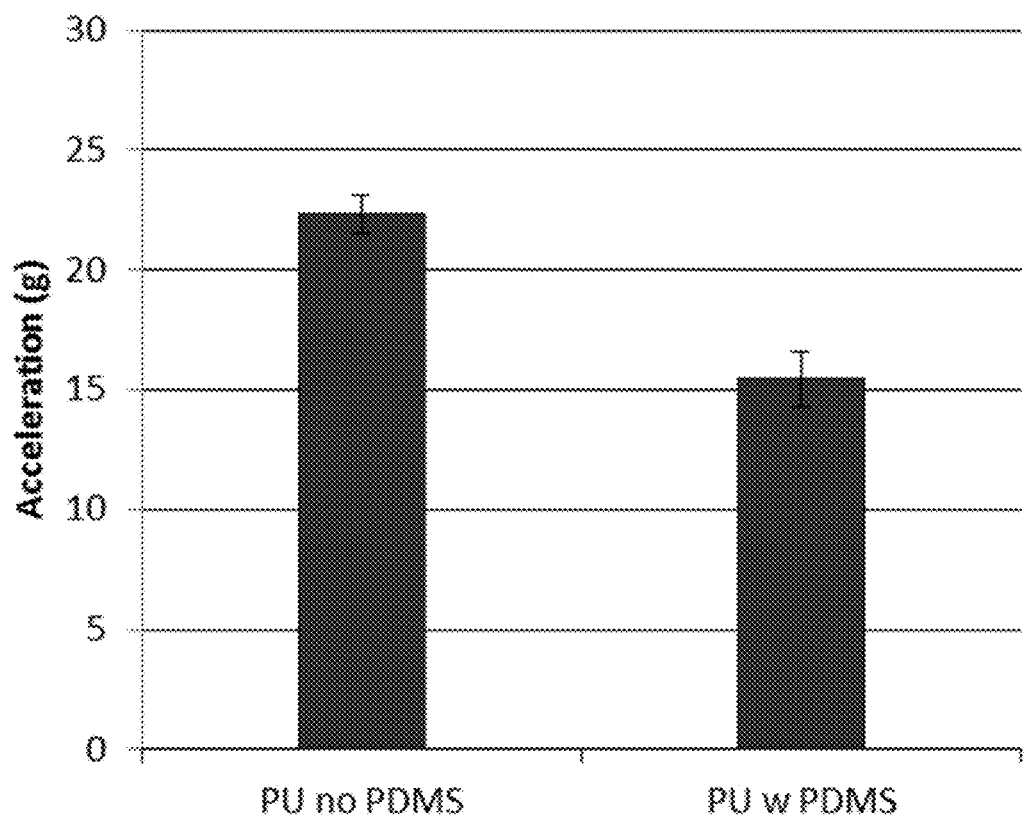
FIG. 10 is a graph comparing the shock absorption performance of polyurethane form to that of PDMS-impregnated polyurethane foam.
Figure 11B:
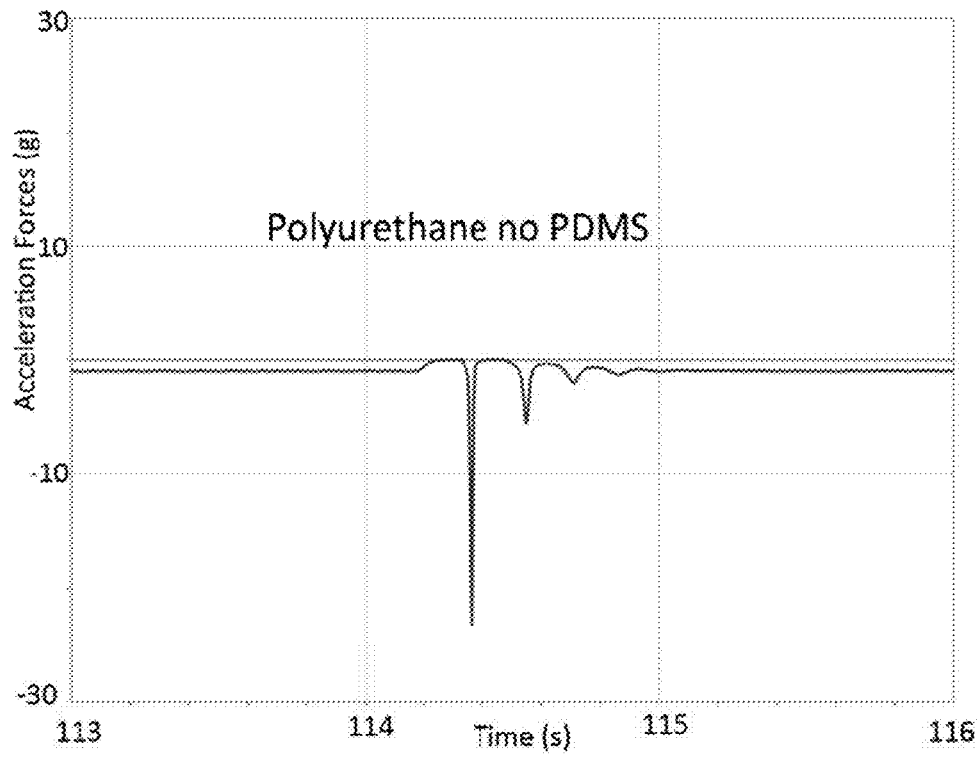
FIGS. 11(a) and 11(b) are graphs comparing the shock absorption profiles of polyurethane foam by itself and PDMS-impregnated polyurethane foam, respectively.
Figure 11A:
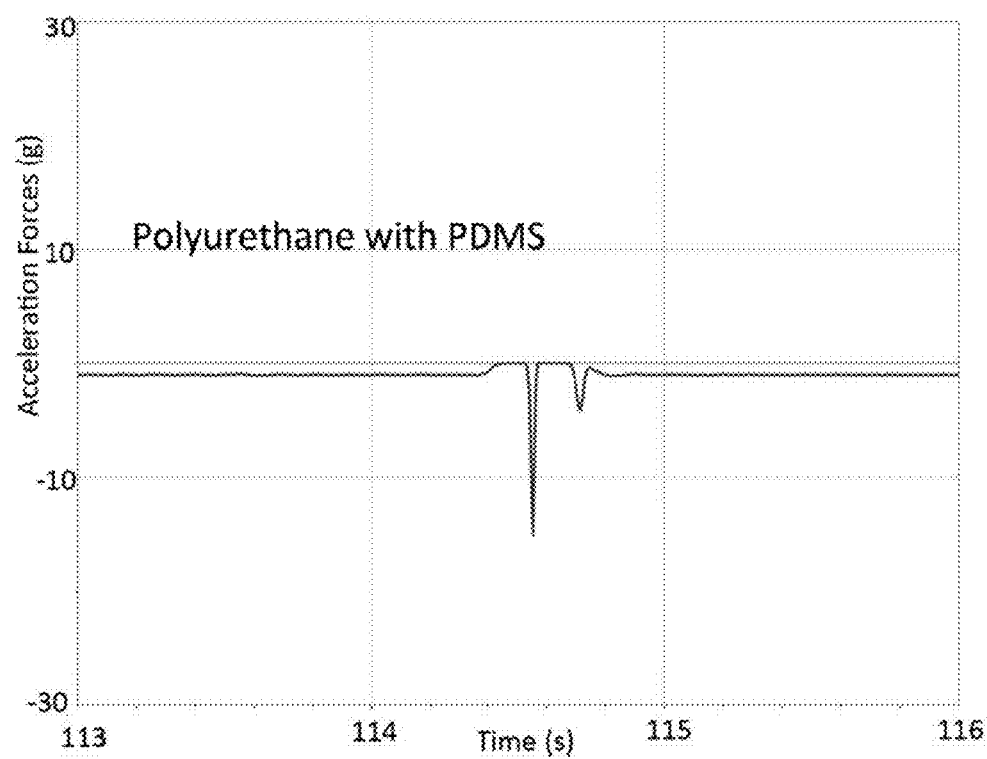

FIGS. 10, 11(a) and 11(b) depict the shock absorption performance of non-impregnated and PDMS-impregnated low-density polyurethane foams, the shock absorption profile of non-impregnated low-density polyurethane foam, and the shock absorption profile of PDMS-impregnated low-density polyurethane foam, respectively. Because the low-density polyurethane foam has a higher density than the polystyrene foams described above, the weight of the object used in the 3.5 inch drop tests was increased to 15 pounds. Additionally, the use of an object weighing 15 pounds better simulates the effects on impacts to human heads, as a typical high school student's head weighs approximately 15 pounds.

The composite material exhibited a roughly 30% improvement in shock absorption compared to the greater than 20 g acceleration experienced by the non-impregnated foam. The shock absorption profile of the composite material also showed a higher degree of secondary shock wave reduction as compared to the non-impregnated material, thus providing further evidence of the improvement in shock absorption performance of the polymer containing a non-Newtonian fluid. It is also expected that the manufacturing process used in the creation of the composite material will provide for more consistent shock reduction performance over a wide range of use conditions, since the incorporated non-Newtonian fluid would be expected to be less susceptible to adverse impact from local environmental conditions (e.g., moisture, evaporation, etc.) because of its incorporation during the polymerization process for the foam. Additionally, incorporation of the non-Newtonian fluid during the polymerization process of the foam allows the non-Newtonian fluid to be incorporated in to closed-cell foams and the production of composite materials in which the non-Newtonian fluid is uniformly and homogeneously distributed in the polymer foam matrix. The use of a closed-cell foam may allow the non-Newtonian fluid to be fully encapsulated within the foam, preventing the leaching of the non-Newtonian fluid from the composite material and rendering the composite material waterproof and unaffected by environmental contaminants, such as sweat.

According to a variety of exemplary embodiments, the composite materials herein may be incorporated into a wide variety of products, apparatuses, or devices (collectively referred to as "products"). Non-exclusive examples of products that may utilize such composite materials include helmets (e.g., sports helmets for use in football, baseball, hockey, lacrosse, or other sports in which impacts may be experienced, motorcycle and bicycle helmets, and any other type of helmet); padding for clothing or uniforms (e.g., shoulder pads, shin pads, knee pads, elbow pads, and any other type of padding worn by a human); footwear (shoe soles, etc.); gloves (e.g., work gloves, sporting gloves such as boxing gloves, hockey gloves, lacrosse gloves, etc.); cases or housings for electronics such as phones, computers, tablets, and the like; linings or padding for vehicle seats, child safety seats, and other types of seating; vehicle headrests, dashboards, door components, and other vehicle parts that may be impacted by a driver or passenger in a vehicle collision; playground equipment lining; exercise and gym mats; and packaging material for goods.

Although the present disclosure contemplates a wide variety of composite materials and methods of making the same, the following examples are provided by way of illustration, and are not intended as limiting with respect to the present disclosure and the scope of the inventions described herein. Accordingly, it should be understood that other materials and combinations of materials, and methods of making the same, are contemplated by the present disclosure and are intended to be a part hereof.

Example 1

Polyacrylamide/Polystyrene Composite Material

In a first example, a polyacrylamide/polystyrene composite material may be produced according to the following procedure.

For the non-Newtonian fluid, 1.5 grams of polyacrylamide (molecular weight>1,000,000) is added to a mixing container, and 150 mL of water is added to the container with the polyacrylamide. To aid in the dissolving of the polyacrylamide, the solution is slowly poured back and forth between two containers until the polyacrylamide is completely dissolved. Once the polyacrylamide is completely dissolved, the process of pouring the solution back and forth between the two containers is continued for between approximately 5 and 10 minutes, after which the solution is allowed to rest for between approximately 1 and 2 hours. To ensure correct mixing, the solution is then checked to confirm that the solution has the ability to self-siphon (Self-siphoning fluids tend to be solutions of long chain polymers, and self-siphoning refers to the ability of the solution to "pull" the solution over the crest of the container without any added force; once the fluid goes past the crest of the container, the fluid that has made it over the crest will simply pull the rest of the solution out of the container with no additional force; this is sometimes referred to as a "tubeless siphon"). The resulting non-Newtonian fluid is a 1% w/w solution of polyacrylamide in water (e.g., 150 grams of non-Newtonian fluid solution would include 1.5 grams of polyacrylamide and 148.5 grams of water).

To incorporate the non-Newtonian fluid into a polymer matrix, a preferred size of polystyrene foam (e.g., sized for a particular product or application) is cut or otherwise formed, and the desired amount of non-Newtonian fluid (in this case, polyacrylamide in water) is measured out. The non-Newtonian fluid is then dispersed across the top of the foam and is absorbed into the foam. According to an exemplary embodiment, the absorption process may take approximately five minutes, although according to other exemplary embodiments, the amount of time for absorption may differ depending on a variety of factors, including the amount of non-Newtonian fluid and size/shape of foam, the types of non-Newtonian fluid and foam used, and other factors). After the absorption is complete, the foam is repeatedly compressed and decompressed for a suitable amount of time to ensure that the non-Newtonian fluid is uniformly dispersed throughout foam.

Example 2

Polyethylene Glycol/Polystyrene Composite Material

In a second example, a polyethylene glycol/polystyrene composite material may be produced according to the following procedure.

For the non-Newtonian fluid, 4 grams of polyethylene glycol (molecular weight of approximately 4,000,000) are added to a mixing container. Approximately 40 mL of ethanol, isopropanol, or acetone are then added to the polyethylene glycol while stirring rapidly to ensure that aggregation does not occur. Stirring continues until the solution is completely homogenous (e.g., for approximately 10 minutes, although the time may differ depending on the solvent selected). During the stirring process, 400 mL of water is slowly added to avoid aggregation within the solution. The solution is then slowly poured back and forth between two containers until the solution is completely homogenous, after which the solution may be checked to ensure that it self-siphons. The solution may then be allowed to rest for a suitable time (e.g., approximately 4 hours) to allow the alcohol to evaporate. The resulting non-Newtonian fluid is a 1% w/v solution of polyethylene glycol.

To incorporate the non-Newtonian fluid into a polymer matrix, a preferred size of polystyrene foam (e.g., sized for a particular product or application) is cut or otherwise formed, and the desired amount of non-Newtonian fluid (in this case, polyethylene glycol) is measured out. The non-Newtonian fluid is then dispersed across the top of the foam and is absorbed into the foam. According to an exemplary embodiment, the absorption process may take approximately five minutes, although according to other exemplary embodiments, the amount of time for absorption may differ depending on a variety of factors, including the amount of non-Newtonian fluid and size/shape of foam, the types of non-Newtonian fluid and foam used, and other factors). After the absorption is complete, the foam is repeatedly compressed and decompressed for a suitable amount of time to ensure that the non-Newtonian fluid is uniformly dispersed throughout foam.

Example 3

Polydimethylsiloxane/Polyurethane Composite Material

In a third example, a polydimethylsiloxane/polyurethane composite material may be produced according to the following procedure.

An appropriate amount of non-Newtonian fluid (e.g., polydimethylsiloxane) is measured out for a desired w/w percentage for a given application. For example, a 30% w/w composite of polydimethylsiloxane in urethane would require 10 grams of polydimethylsiloxane for 32 grams composite (other 22 grams is polyurethane foam matrix). Once the polydimethylsiloxane is measured out, the appropriate amount of monomer A (16.5 grams polyol) is weighed and added to the previously-measured polydimethylsiloxane. These components are then mixed together until completely homogenous. An isocyanate cross linker (11 grams) is added to the polyol-polydimethylsiloxane solution mixture and mixed until homogenous. According to an exemplary embodiment, the mixing is completed in a relatively short time frame (e.g., approximately 30 seconds), at which point the polymerization and foaming process begins to take place. According to an exemplary embodiment, the ratio of monomer A (polyol) to monomer B (isocyanate) is 60:40. This can be adjusted appropriately for the desired application; however, there must be excess isocyanate present (determined by molar equivalents of isocyanate to polyol) to produce the $CO_2$ needed for foaming (otherwise an additional foaming agent will need to be introduced). The composite material is then allowed to cure for approximately 24 hours at room temperature. According to other exemplary embodiments, the curing may be performed at approximately 60 degrees Celsius, such as by disposing the foam in a mold heated to a consistent temperature by an oven or water bath. According to still other exemplary embodiments, the curing time and temperature may vary according to other exemplary embodiments depending on the constituents used and other factors.

Example 4

Polydimethylsiloxane/Polyurethane Composite Material

In a fourth example, a polydimethylsiloxane/polyurethane composite material may be produced according to the following procedure.

A mixture was formed by adding 60 parts by weight of a polyol solution and 35 parts by weight of polydimethylsiloxane (PDMS) 300,000 cSt to a mixing container. The polyol and PDMS mixture was then mixed with a drill mixer attachment at greater than 1,000 revolutions per minute (RPM), producing a blended mixture that was white in appearance, frothy, and bubbly. An isocyanate solution in an amount of 40 parts by weight was then added to the blended polyol and PDMS mixture, and the isocyanate/polyol/PDMS mixture was then mixed with a drill mixer attachment at greater than 1,000 RPM for approximately 15-20 seconds until the blended mixture started to foam. The foaming mixture was then quickly transferred to an aluminum mold that was pre-treated with an anti-stick coating, and the top cover of the mold was secured over the mold cavity and fastened with clamps. After curing for approximately 4-24 hours, the PDMS/polyurethane composite material was removed from the mold.

Example 5

Silicone Foam Composite Material

In a fifth example, a silicone foam composite material may be produced according to the following procedure.

A mixture was formed by adding 40 parts by weight of a polyorganosilane solution and 30 parts by weight of polydimethylsiloxane (PDMS) 300,000 cSt to a mixing container. The polyorganosilane and PDMS mixture was then mixed with a drill mixer attachment at greater than 1,000 revolutions per minute (RPM), producing a blended mixture that was white in appearance, frothy, and bubbly. A siloxane catalyst solution in an amount of 80 parts by weight was then added to the blended polyorganosilane and PDMS mixture, and the mixture was then mixed with a drill mixer attachment at greater than 1,000 RPM for approximately 15-20 seconds until the blended mixture started to foam. The foaming mixture was then quickly transferred to an aluminum mold that was pre-treated with an anti-stick coating, and the top cover of the mold was secured over the mold cavity and fastened with clamps. After curing for approximately 20 minutes, the silicone foam composite material was removed from the mold and allowed to cure for an additional 24 hours to allow the composite to achieve full strength.

Example 6

Helmet Impact Tests

Figure 13C:
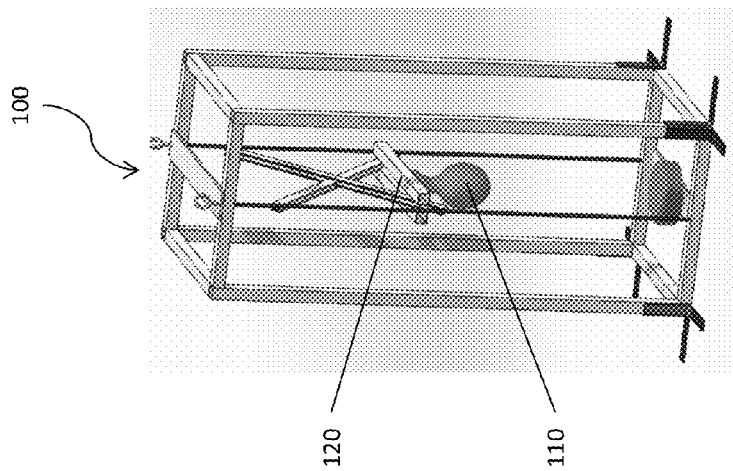
FIGS. 13(a)-13(c) illustrate various perspective views of an impact drop test rig, according to an exemplary embodiment.
Figure 13B:
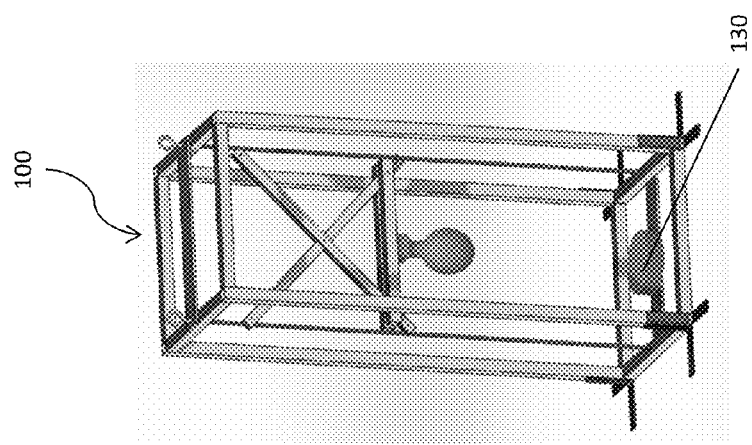
Figure 13A:
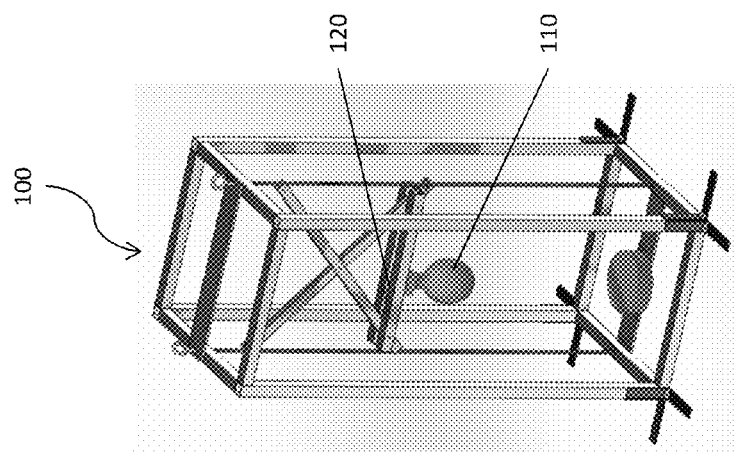

Helmet impact tests were carried out utilizing an impact drop rig 100 of the type shown in FIGS. 13(a)-13(c). The helmet drop rig 100 was analogous to a NOCSAE twin wire, frictionless drop assembly, and was outfitted with a hybrid III dummy head neck/assembly 110. The hybrid III dummy head/neck assembly 110 was secured to the base of the drop carriage 120 such that the head/neck assembly would contact an impact target 130 during an impact drop test, and the head neck assembly 110 was outfitted with an accelerometer located at the center of gravity of the dummy head. The accelerometer was configured to measure the acceleration forces produced during a helmet drop test in when the head/neck assembly 110 contacts the impact target 130.

Figure 12:
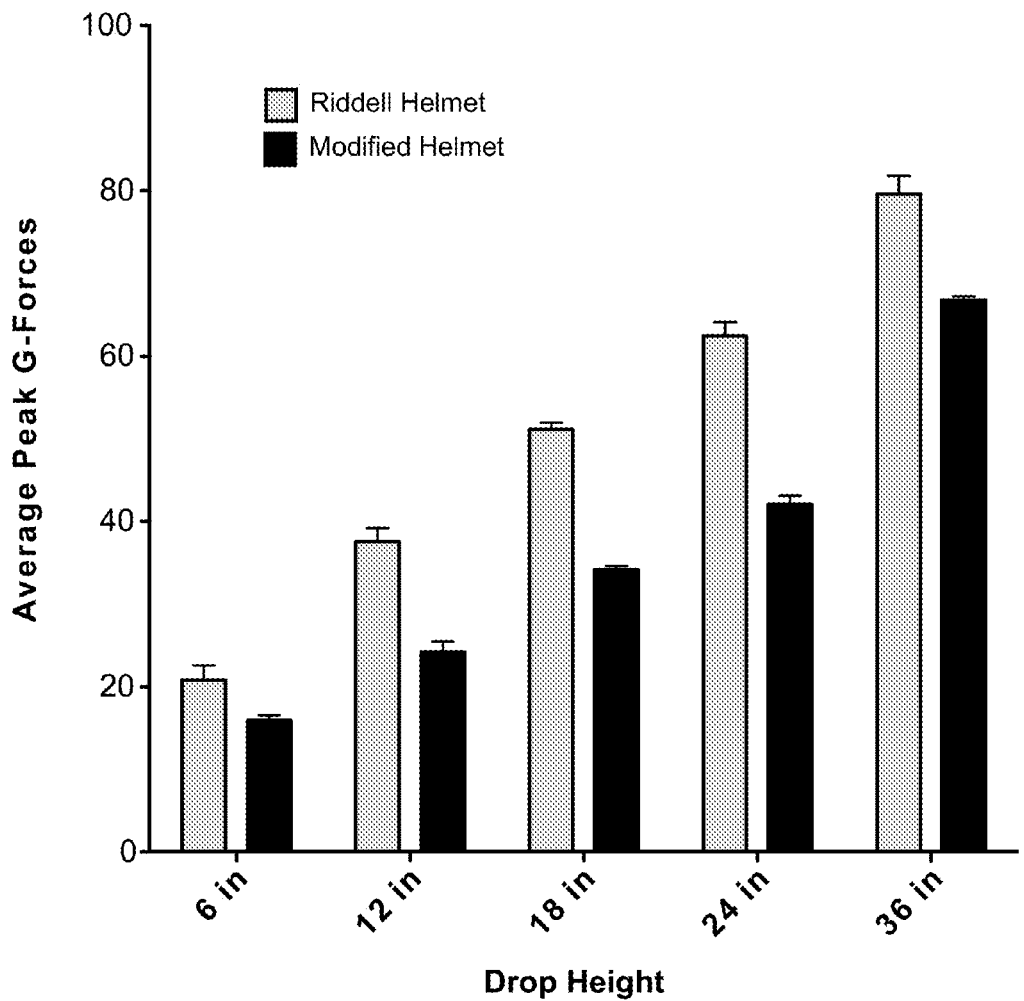
FIG. 12 is a graph comparing the impact drop test results of an unmodified helmet and a helmet modified to utilize a polyurethane foam-non-Newtonian fluid composite material.

A Riddell Speed Classic Helmet was then modified by stripping the foam provided by the manufacturer and replaced with the polyurethane foam composite material produced in Example 4. The polyurethane foam composite material utilized in the modified helmet had the same shape and thickness as the manufacturer supplied foam. For the sake of comparison, an unmodified helmet was subjected to impact drop tests in parallel with the modified helmet. Drop heights of 6, 12, 24, 36, and 48 inches were employed utilizing the helmet drop rig 100 with the helmet mount on the dummy head/neck assembly 110, and peak acceleration forces were measured using the accelerometer. The mean and standard deviation of five iterations of each test for the modified and unmodified helmet are provided in Table 2, and depicted in FIG. 12. The data demonstrates that the composite material produced lower average peak impact acceleration forces than the manufacturer supplied foam, indicating that the composite material provided better protection against all impacts. Thus, the composite material provides better protection against injuries and long-term negative health effects produced by impact acceleration forces than the manufacturer supplied foam.

TABLE 2

| Drop Height (in) | G-forces experienced by Riddell Helmet | | | G-Forces Experienced by Modified Helmet | | |
|---|---|---|---|---|---|---|
| | Mean | Standard Deviation | N (replicates) | Mean | Standard Deviation | N (replicates) |
| 6 | 20.8282 | 1.754533 | 5 | 15.9226 | 0.620869 | 5 |
| 12 | 37.6054 | 1.609977 | 5 | 24.2386 | 1.228886 | 5 |
| 24 | 51.155 | 0.8165865 | 5 | 34.1872 | 0.4493214 | 5 |
| 36 | 62.5 | 1.629793 | 5 | 42.0762 | 1.054014 | 5 |
| 48 | 79.5898 | 2.252049 | 5 | 66.8108 | 0.4535093 | 5 |

Example 7

Polydimethylsiloxane/Polyurethane Composite Material

Polyurethane and polydimethylsiloxane (PDMS) composite materials were produced with a modulus of elasticity at 100% elongation of 0.105 MPa and 0.032 MPa, to determine the effect of modulus of elasticity on the ability of the composite materials to reduce impact acceleration forces. The composite materials included 30% by weight PDMS. The composite materials were subjected to impact drop tests from a height of 3.5 inches with a 25 pound weight. A polyurethane foam that was not impregnated with a non-Newtonian fluid was also subjected to the impact drop tests as a control.

Figures 14A, 14B, 14C:
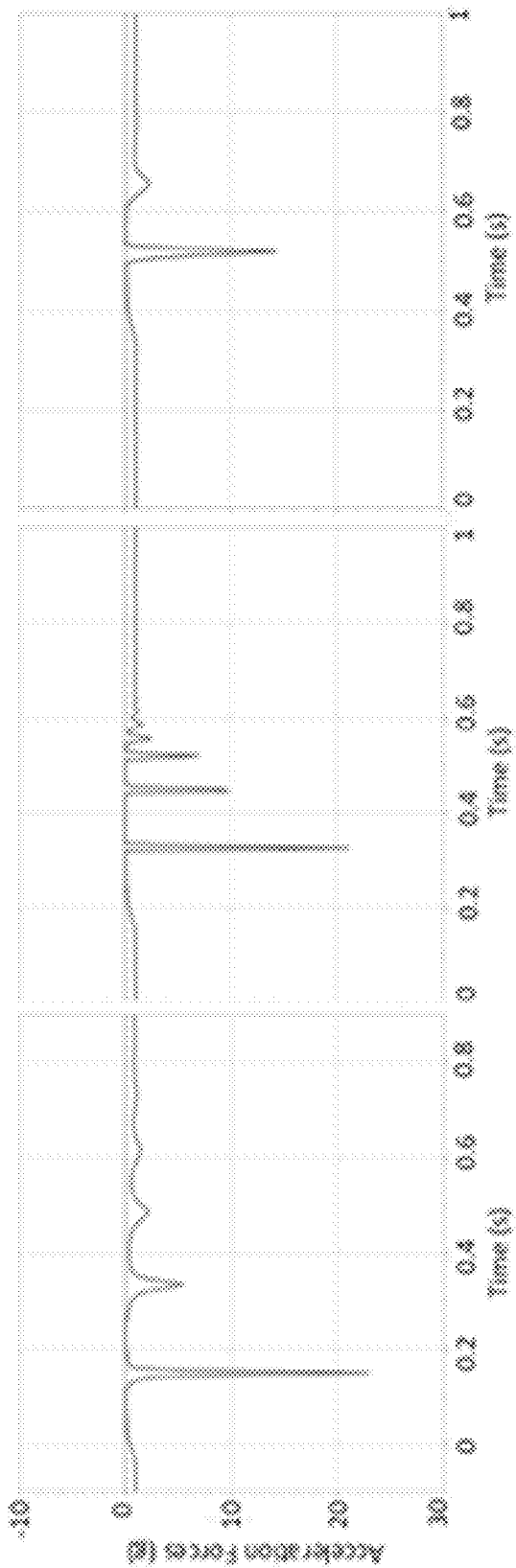
FIGS. 14(a)-14(c) depict graphs comparing the acceleration forces of an impact in a drop test of polyurethane foam, a polyurethane and non-Newtonian fluid composite material with an elastic modulus of greater than 0.1 MPa at 100% elongation, and a polyurethane and non-Newtonian fluid composite material with an elastic modulus of less than 0.1 MPa at 100% elongation, respectively.

The acceleration forces produced by the impact drop tests are shown in FIGS. 14(a)-14(c) for the polyurethane with no non-Newtonian fluid, the composite material with a modulus of elasticity of 0.105 MPa, and the composite material with a modulus of elasticity of 0.032 MPa, respectively. The data demonstrates that composite material with a modulus of elasticity of 0.032 MPa effectively reduces both the initial impact acceleration forces and the shockwave acceleration forces in comparison to the polyurethane with no non-Newtonian fluid. By contrast the composite material with a modulus of elasticity of 0.105 MPa increased shockwave acceleration forces in comparison to the polyurethane with no non-Newtonian fluid, and exhibited a minimal reduction of the initial impact acceleration forces. Thus, the composite material with a modulus of elasticity at 100% elongation of 0.032 MPa effectively reduced both the initial acceleration forces and the shockwave acceleration forces, indicating that the modulus of elasticity of the composite materials at least in part determines the impact acceleration performance of the material.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the exemplary embodiments are illustrative only. Although only a few embodiments have been described in detail in this disclosure, those skilled in the art who review this disclosure will readily appreciate that many modifications are possible (e.g., variations in values, manufacturing processes, etc.) without materially departing from the novel teachings and advantages of the subject matter described herein. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed:

1. A composite material comprising:
   a polymer foam matrix; and
   a non-Newtonian fluid impregnated in the polymer foam matrix,
   wherein the composite material has an elastic modulus of less than 0.1 MPa at 100% elongation, the polymer foam matrix comprises polyurethane, and the non-Newtonian fluid comprises polydimethylsiloxane.

2. The composite material of claim 1, wherein the polymer foam matrix is an open-cell foam.

3. The composite material of claim 1, wherein the polymer foam matrix is a closed-cell foam.

4. The composite material of claim 1, wherein the polymer foam matrix has a density in the range of about 50 $g/m^3$ to about 500,000 $g/m^3$.

5. The composite material of claim 1, wherein the non-Newtonian fluid is not covalently bonded to the polymer foam matrix.

6. The composite material of claim 1, wherein the non-Newtonian fluid has a viscosity in the range of about 60,000 cSt to about 1,000,000 cSt.

7. The composite material of claim 1, wherein the non-Newtonian fluid is hydrophobic.

8. The composite material of claim 1, wherein the composite material has a density in the range of about 50 $g/m^3$ to about 5,000,000 $g/m^3$.

9. The composite material of claim 1, wherein the non-Newtonian fluid is present in an amount of about 10% to about 90% of the total weight of the composite material.

10. The composite material of claim 1, wherein the composite material is incorporated into a product selected from the group consisting of a helmet, clothing, a uniform, footwear, a glove, a case for an electronic device, a housing for an electronic device, a vehicle seat, a vehicle headrest, a vehicle dashboard, a vehicle door component, playground equipment, an exercise mat, a gym mat, and a packaging material.

11. The composite material of claim 1, wherein an initial impact acceleration force and a shockwave acceleration force of an impact cushioned by the composite material are less than an initial impact acceleration force and a shockwave acceleration force of an equivalent impact cushioned by the polymer foam matrix alone.

12. The composite material of claim 1, wherein an impact cushioned by the composite material produces initial impact acceleration force that is at least about 30% lower than an equivalent impact cushioned by the polymer foam matrix alone.

13. A product for reducing acceleration forces in an impact, comprising:
    a composite material having an elastic modulus of less than 0.1 MPa at 100% elongation,
    wherein the composite material includes a non-Newtonian fluid impregnated in a polymer foam matrix, the polymer foam matrix comprises polyurethane, and the non-Newtonian fluid comprises polydimethylsiloxane.

14. The product of claim 13, wherein the product is a helmet.

15. The product of claim 13, wherein the product is a case or housing for an electronic device.

16. The product of claim 13, wherein the product is an item of clothing, a uniform, footwear, or a glove.

17. The product of claim 13, wherein the product is a vehicle seat, a vehicle headrest, a vehicle dashboard, a vehicle door component, or other vehicle component that may contact a vehicle occupant in the event of a vehicle crash.

18. The product of claim 13, wherein the product is a playground equipment component, an exercise mat, or a gym mat.

19. The product of claim 13, wherein the product is a packaging material.

* * * * *